Patented May 29, 1928.

1,671,256

UNITED STATES PATENT OFFICE.

CURT RÄTH, OF BERLIN, GERMANY.

PROCESS FOR THE PREPARATION OF 2-AMINO-5-IODO-PYRIDINE.

No Drawing. Application filed February 1, 1926, Serial No. 85,377, and in Germany February 2, 1925.

The object of this invention is an improved method for making 2-amino-5-iodo-pyridine for therapeutic requirements. The formula of the product is

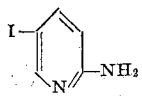

My process can be carried out by treating 2-amino-pyridine in the presence of solvents with iodine-alkali-iodide, which preferably contains an excess of iodine. The reaction product obtained, is separated after standing some time from the liquid and moistened with a solution of alkali-metal hydroxide containing more than 10% alkali metal hydroxide, avoiding heating, by which the decomposition of the reaction product may be caused. The mixture is then agitated. By this treatment a nearly complete decoloration of the previoulsy bluish-black reaction product is achieved. The solid product is separated from the alkaline solution, washed with water and recrystallized for instance from water. By the first recrystallization a product of for instance, 98% is obtained which can be used for many purposes without further purification. By another recrystallization the product is obtained in a pure form ready for analysis.

The concentration of alkali-metal-hydroxide solutions may be of 10 to 30%. Solutions of about 20 to 25% alkali-metal-hydroxide may be used with advantage. By using a solution of alkali-metal-hydroxide of these concentrations I have succeeded in converting the bluish-black reaction product into a product of high purity with very good yields. With dilute solutions of alkali-metal-hydroxide, for instance of 3% it would be necessary to work at elevated temperatures, for instance, at boiling point. This would give rise to the decomposition of the reaction product, ammonia being split off. My process however does not require heating.

*Example.*

36 grams of 2-amino-pyridine are dissolved in 140 grams of water. This solution is poured into an aqueous iodine-potassium iodide solution, containing iodine in excess of that required to furnish one mole iodine for each mole of the pyridine compound. The mixture is then allowed to stand for several hours, for instance 6–12 hours, whereupon a bluish-black crude product is precipitated. The crude product is filtered off and digested with a 20% sodium hydroxide solution. This leaves a very slightly colored product which is filtered off. This product is now recrystallized from water and a 2-amino-5-iodo-pyridine of high purity is obtained. The product contains approximately 98% of 2-amino-5-iodo-pyridine.

What I claim is:

1. Process for the preparation of 2-amino-5-iodo-pyridine which consists in iodating 2-amino-pyridine in the presence of solvents by means of an iodine alkali iodide solution, digesting, without heating, the crude product thus formed with concentrated alkali-metal-hydroxide solution to remove undesired products and recrystallizing the residue.

2. Process for the preparation of 2-amino-5-iodo-pyridine which consists in iodating 2-amino-pyridine in the presence of an iodine-alkali-iodide solution, digesting, without heating the crude product thus formed with a solution containing of 10 to 30% alkali-metal-hydroxide, to remove undesired products, and recrystallizing the residue.

3. Process for the preparation of 2-amino-5-iodo-pyridine which consists in iodating 2-amino-pyridine in the presence of an iodine-alkali-iodide solution, digesting without heating the crude product thus formed with a solution containing 20 to 25% alkali-metal, to remove undesired products, and recrystallizing the residue.

In testimony whereof I affix my signature.

Dr. CURT RÄTH.